United States Patent
McCorkendale et al.

(10) Patent No.: US 8,806,644 B1
(45) Date of Patent: Aug. 12, 2014

(54) USING EXPECTATION MEASURES TO IDENTIFY RELEVANT APPLICATION ANALYSIS RESULTS

(75) Inventors: Bruce McCorkendale, Manhattan Beach, CA (US); Jun Mao, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/481,715

(22) Filed: May 25, 2012

(51) Int. Cl.
   *G06F 21/00* (2013.01)
   *H04L 29/06* (2006.01)

(52) U.S. Cl.
   CPC ................................ *H04L 63/1416* (2013.01)
   USPC ............................................ 726/24; 713/188

(58) Field of Classification Search
   USPC ........................................................ 726/24
   See application file for complete search history.

(56) References Cited

U.S. PATENT DOCUMENTS

| | | | |
|---|---|---|---|
| 7,181,768 B1 * | 2/2007 | Ghosh et al. | 726/23 |
| 2004/0098607 A1 * | 5/2004 | Alagna et al. | 713/200 |
| 2005/0086500 A1 * | 4/2005 | Albornoz | 713/188 |
| 2005/0155031 A1 * | 7/2005 | Wang et al. | 717/170 |
| 2005/0188272 A1 * | 8/2005 | Bodorin et al. | 714/38 |
| 2007/0101424 A1 * | 5/2007 | Ravi et al. | 726/22 |
| 2008/0010683 A1 * | 1/2008 | Baddour et al. | 726/24 |
| 2008/0109871 A1 * | 5/2008 | Jacobs | 726/1 |
| 2009/0049549 A1 * | 2/2009 | Park et al. | 726/22 |
| 2012/0124075 A1 * | 5/2012 | Galluscio | 707/769 |
| 2013/0254880 A1 * | 9/2013 | Alperovitch et al. | 726/22 |

* cited by examiner

*Primary Examiner* — Yogesh Paliwal
(74) *Attorney, Agent, or Firm* — Brill Law Office; Jeffrey Brill

(57) ABSTRACT

An application is analyzed, thereby detecting behaviors of the application. Data indicative of the functionality of the application is mined from a plurality of sources. The application is categorized based on the mined data. The categorization of the application indicates expected application behaviors. Multiple categories can be assigned to the application, wherein each assigned category correlates with at least one expected application behavior. Measures of consistency between the detected behaviors of the application and the expected behaviors of the application are determined. Determining the measures of consistency comprises quantifying differences between detected behaviors of the application and expected behaviors of the application. Responsive to the determined measures of consistency, it is adjudicated whether the application is suspect of being malicious.

20 Claims, 4 Drawing Sheets

USING EXPECTATION MEASURES TO IDENTIFY RELEVANT APPLICATION ANALYSIS RESULTS

TECHNICAL FIELD

This disclosure pertains generally to computer security, and more specifically to using expectation measures to identify relevant application analysis results.

BACKGROUND

Mobile computing devices such as smartphones and tablet computers are becoming more widely used every day. Android is an open-source, Linux based operating system for such mobile devices that is gaining an increasingly prevalent market share. A large community of developers write applications ("apps") that run on Android devices. Many of these apps are available either for purchase or for free through the online Android Market, which is run by Google. Android apps can also be downloaded from other online stores and additional third-party sites. With the open nature of the Android environment, anyone can create and distribute Android apps.

Because of its openness, the Android platform is vulnerable to an attack called trojanization. To implement this attack, a malicious party starts with a legitimate app, downloaded from an online store or other source. The attacker strips the app's digital signature, adds additional (malicious) code to the app, resigns the app with an anonymous digital certificate, and redistributes the now malicious app to unsuspecting users through one of the existing channels. In effect, the attacker is taking advantage of the openness of the Android development and distribution environment to hide malicious code in an existing, legitimate app. Users seeking to download and run the legitimate app are tricked into downloading the trojanized version. When the trojanized app runs on the user's Android device, the new code the attacker added can execute malicious functionality, such as stealing contact information, logging data input, sending fraudulent communications, etc.

Mobile security products exist for Android which analyze apps, and warn users of potentially malicious behavior. An Android app is distributed in the form of an APK (Android Application Package) file. These security products examine APK files and attempt to identify potentially malicious code. Such products typically examine the permissions that an app (or other type of application) requests, and then warn the user concerning the ways in which the requested permissions can be misused. For example, an app with permission to send text messages could fraudulently send numerous premium rate service messages, resulting in a large bill for the user. An app with GPS access and network communication privileges could track the user's location, and transmit this information to a malicious party. Likewise, apps with permissions allowing them to send emails, make phone calls, record audio and/or video, etc., can use these access privileges for malicious purposes.

The use of such permissions is legitimately required by many benign apps, such as navigation apps, appointment dialers, camera apps, etc. The fact that an app requests a given permission (e.g., use of the phone on a mobile computing device) is not a cause for concern in and of itself. Certain types of apps, for example an appointment dialer, must use the phone to execute their primary functionality. On the other hand, other types of apps, for example a wallpaper app, would not be expected to use the phone. Thus, warning a user that an app requests permissions that can be used for malicious purposes is of limited helpfulness. Many benign apps have legitimate needs for these permissions. When presented with a warning that an app seeks various permissions that could enable malicious behavior, an average user does not know if the app does or does not have a legitimate reason for requesting the permissions. Note that the potential for attacks and the security analysis described herein are not limited to Android apps, but can also occur in the context of applications for other mobile or desktop computing environments.

Some security products for mobile apps (as well as other types of applications) also analyze actions performed by applications, for example by running an application in a confined environment and monitoring what actions the application performs. As with the identification of permissions requested by apps discussed above, these products identify actions that could be used maliciously. For example, such analysis can identify that an application sends emails or text messages, records video or reads privacy sensitive information, such as the user's contacts or the device's International Mobile Equipment Identity (IMEI). As with requesting permissions, these actions have legitimate as well as malicious uses. For example, an application that accesses the user's contacts and sends email messages could send the user's private contact data to a malicious party. On the other hand, it would be legitimate (and necessary) for an email client to access the user's contacts and send emails.

Simply informing the user that a given application requests permissions or performs actions that can potentially be used maliciously is not very useful to an average user. Because these permissions and actions have legitimate uses as well as the potential for malicious misuse, the user is not likely to know how to respond to a warning that an app requests certain privileges or performs certain actions. By heading all such warnings, the user will avoid benign apps that use the requested permissions and perform the detected actions for legitimate purposes. On the other hand, if the user ignores all such warnings, then the user receives no protection from the security product against downloading malware.

It would be desirable to address these issues.

SUMMARY

Differences between detected behaviors of an application and expected behaviors of the application are quantified, in order to determine whether the application is suspect of being malicious. The application is analyzed, thereby detecting behaviors of the application. The analyzing of the application can take the form of determining permissions that the application requests, determining data and/or system resources that the application attempts to access, and determining actions that the application executes. Application functionality can be detected through static analysis of the application, e.g., examining the binary image of the application, and/or through dynamic analysis of the application, e.g., running the application in an isolated environment and monitoring its behavior.

Data indicative of the functionality of the application is mined from a plurality of sources. The mined data can comprise data that is indicative of how the application is represented by its publisher, for example in documentation or marketing material. Descriptions of the application by third parties can also be mined, such as reviews or discussions of the application on web forums. Web searches for the application can be made, and data mined from the search results. Additionally, the application itself can be mined for descriptive data, such as strings in the binary image and user interface text. Mining data indicative of the functionality of the application can comprise locating keywords, key phrases or other descriptive content indicative of one or more categories applicable to the application. In some embodiments, weights are applied to mined data, based on, for example, its content, source or context. In some embodiments, machine learning is utilized to adjust data mining over time, for example to glean more relevant data.

The application is categorized based on the mined data. The categorization of the application indicates expected application behaviors. The categorizing of the application can take the form of applying at least one label indicative of one or more expected behaviors to the application. Multiple categories can be assigned to the application, wherein each assigned category correlates with at least one expected application behavior. In some embodiments, weights are applied to correlations between mined data and expected application behaviors. In some embodiments, machine learning is utilized to adjust application categorization over time, for example to improve accuracy.

Measures of consistency between the detected behaviors of the application and the expected behaviors of the application are determined. Determining the measures of consistency comprises quantifying differences between detected behaviors of the application and expected behaviors of the application. Responsive to the determined measures of consistency, it is adjudicated whether the application is suspect of being malicious. For example, the application can be adjudicated as being benign, suspicious or malicious.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
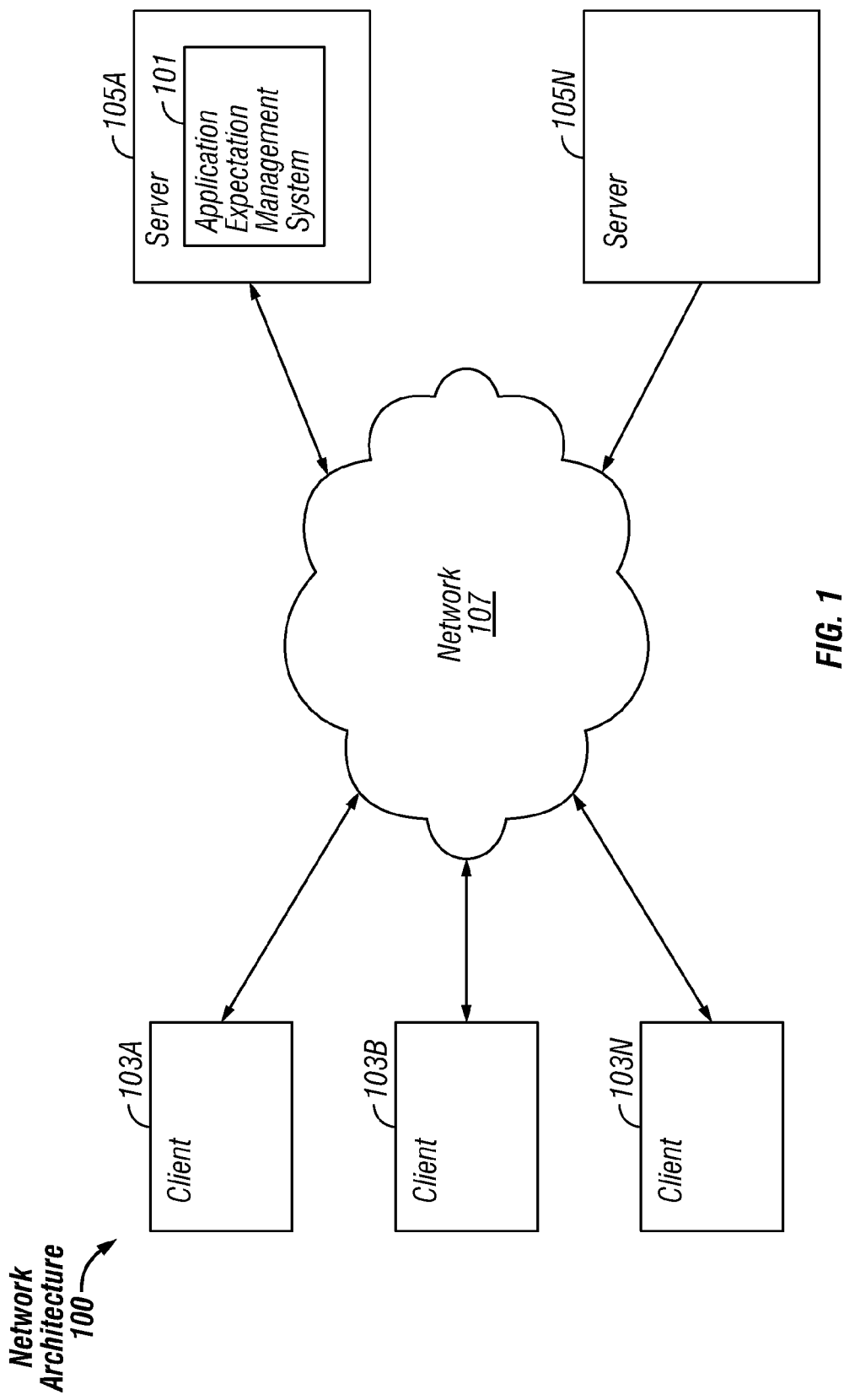
FIG. 1 is a block diagram of an exemplary network architecture in which an application expectation management system can be implemented, according to some embodiments.

FIG. 1 is a block diagram illustrating an exemplary network architecture 100 in which an application expectation management system 101 can be implemented. The illustrated network architecture 100 comprises multiple clients 103A, 103B and 103N, as well as multiple servers 105A and 105N.

In FIG. 1, the application expectation management system 101 is illustrated as residing on server 105A. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
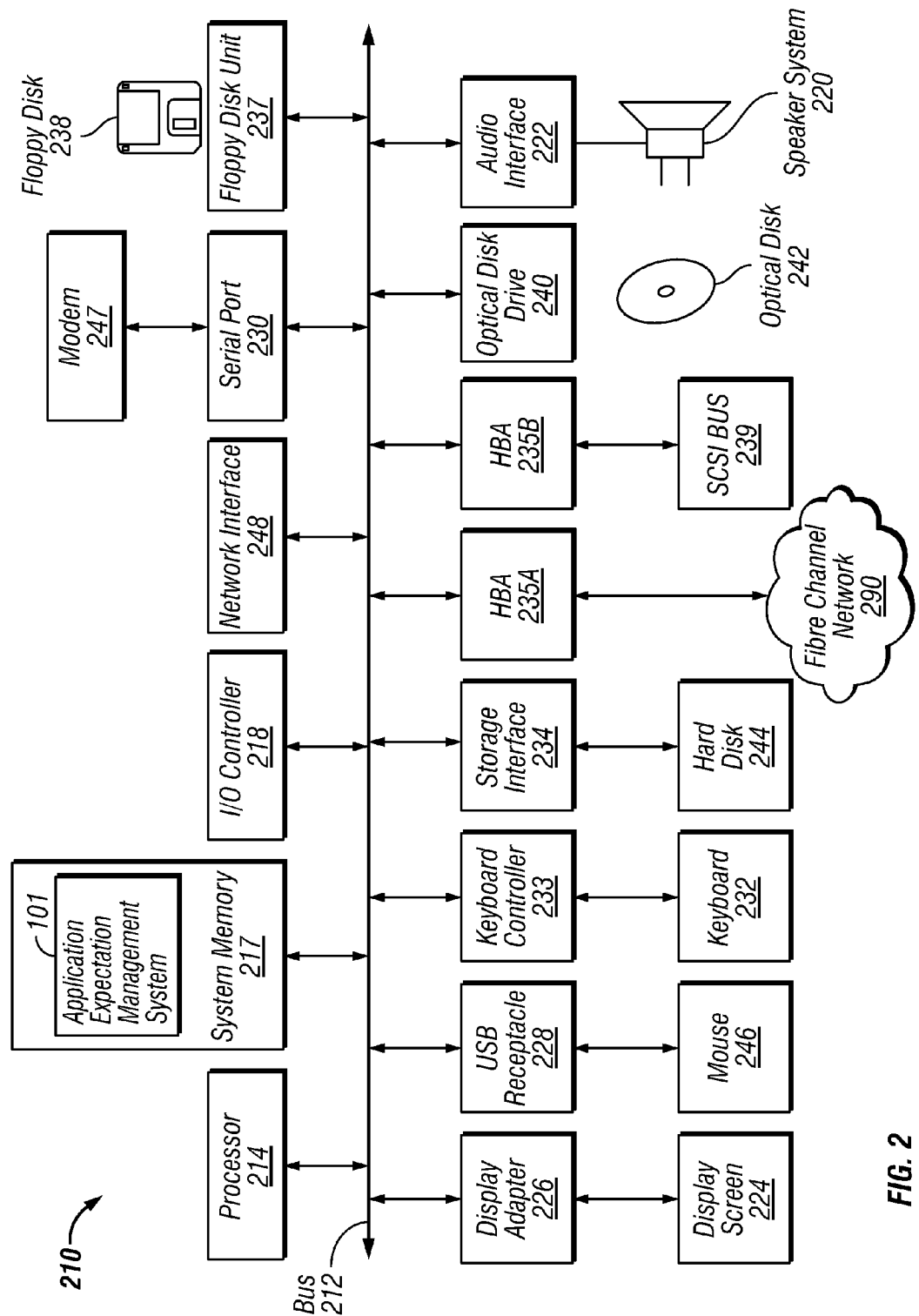
FIG. 2 is a block diagram of a computer system suitable for implementing an application expectation management system, according to some embodiments.

FIG. 2 is a block diagram of a computer system 210 suitable for implementing an application expectation management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the application expectation management system 101 is illustrated as residing in system memory 217. The workings of the application expectation management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
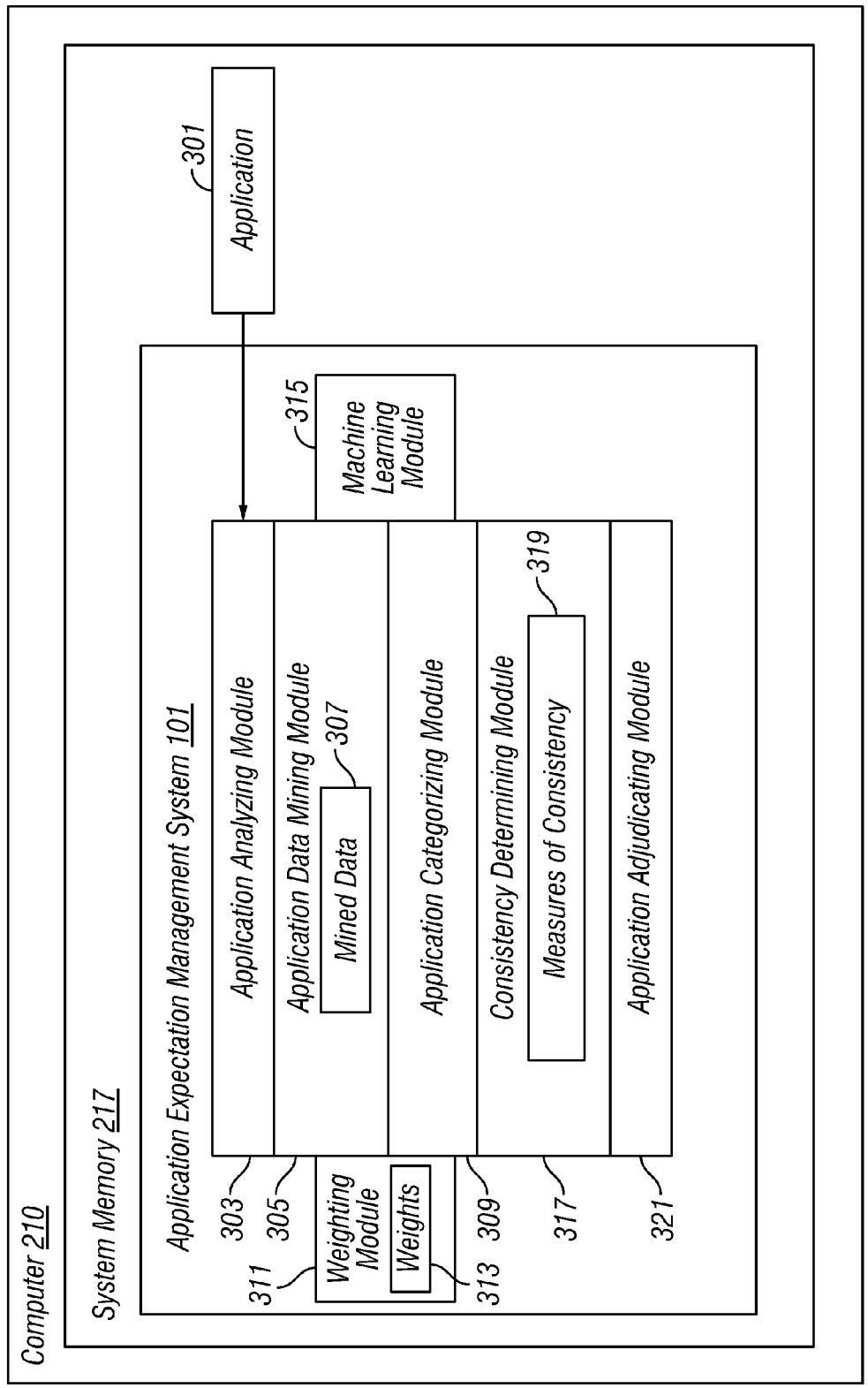
FIG. 3 is a block diagram of the operation of an application expectation management system, according to some embodiments.

FIG. 3 illustrates the operation of an application expectation management system 101, according to some embodiments. As described above, the functionalities of the application expectation management system 101 can reside on a client 103, a server 105, or be distributed between multiple computer systems 210, including within a cloud-based computing environment in which the functionality of the application expectation management system 101 is provided as a service over a network 107. It is to be understood that although the application expectation management system 101 is illustrated in FIG. 3 as a single entity, the illustrated application expectation management system 101 represents a collection of functionalities, which can be instantiated as a single or multiple modules as desired (an instantiation of specific, multiple modules of the application expectation management system 101 is illustrated in FIG. 3). It is to be understood that the modules of the application expectation management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the application expectation management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an application expectation management system 101 runs in the system memory 217 of a computer 210, analyzes specific applications 301 to determine their behaviors, determines what behaviors can be "reasonably expected" of the applications 301, and determines whether the actions of a given application 301 are within the bounds of what is expected. As explained below, applications 301 that are within the bounds of expectation can be adjudicated as benign, whereas those that are outside of the expected parameters can be adjudicated as suspect or malicious.

More specifically, an application analyzing module 303 of the application expectation management system 101 analyzes an application 301, and determines permissions that the application requests, data and system resources that the application 301 attempts to access, and actions that the application 301 executes. For example, the application analyzing module 303 can perform static analysis of the application 301, examining the binary image to detect functionality performed by the application 301. Such static analysis is a type of automated reverse engineering, which involves examining the executable or interpretable image of the application 301 to recreate, to a somewhat approximate degree, the source code of the application 301, and thus to detect the application's functionality (e.g., permissions requested, targets accessed, system call made, etc.).

The application analyzing module 303 can also perform dynamic analysis of the application 301, running it in an isolated environment such as a virtual machine. By running the application 301 in isolation and automatically feeding it input to simulate a user session, the application analyzing module 303 can monitor the behavior of the application 301 under controlled conditions and detect which actions the application 301 performs under different circumstances. For example, the application analyzing module 303 can log the application's output, learn what data and resources it attempts to access, what data it attempts to transmit to outside targets, to which outside targets it attempts to transmit data, what system calls it makes, etc.

In its analysis of the application 301, the application analyzing module 303 notes behaviors of the application 301 that can be used maliciously. The specific actions and requests for permissions or access to resources monitored and noted by the application analyzing module 303 can vary between embodiments. Examples of requested permissions of interest include requests for data transmission privileges (e.g., send text messages, send emails, make voice calls, etc.), requests for permission to use the GPS or other equipment to determine physical location, requests for permission to use the camera or audio/video recording equipment, etc. Requests to access privacy sensitive information can be noted, such as requests to read the IMEI, physical location, contacts, texts, emails, etc. Examples of other actions of interest include sending data to third parties, recording video and/or audio, monitoring physical location, etc.

In one embodiment, the application analyzing module 303 analyzes Android apps 301, for example by analyzing an APK file in which an Android app 301 is distributed, and/or by running the app 301 and monitoring its behavior. In other embodiments, the application analyzing module 303 analyzes applications 301 formatted for other operating systems, either mobile (e.g., iOS, Windows Phone) or otherwise (e.g., Windows, Mac OS, Linux).

An application data mining module 305 of the application expectation management system 101 mines data 307 indicative of the functionality of the application 301 from a plurality of sources. Such data 307 can be in the form of data indicating how the application 301 is represented by its publisher, or how it is described by third parties. The application data mining module 305 can mine data 307 from materials generated by the publisher of the application, such as marketing materials and user documentation concerning the application 301, posted on, e.g., a website from which the application 301 is distributed. For example, Android apps 301 are generally distributed through app stores and the like, which typically provide ample descriptions of and documentation concerning the apps 301 being distributed. The data mining module 305 can also mine data 307 from materials created by third parties, such as user reviews or online comments posted on app review sites, online forums, etc. Data 307 concerning the application 301 can also be gleaned by executing web searches for the application 301, and mining data 307 from the search results. Such web searches can use keywords concerning the application 301 (e.g., the application's name, the name of the publisher, etc.), and can be executed on one or more search engines. The application data mining module 305 can also mine data 307 from the application 301 itself (e.g., from the binary image and/or by running the application and logging the output). In these cases, the application data mining module 305 can glean data 307 from the application 301 such as strings contained in the binary image, user interface resource text, etc.

Whatever the sources, the application data mining module 305 mines data 307 concerning the application 301 that can be used to categorize the application 301. More specifically, different applications 301 are represented or described as providing different functions. As described in detail below, the functional categorization of an application 301 can be used to determine whether its detected behavior is reasonably expected and thus legitimate for an application 301 of its type. For example, one specific application 301 could be represented as a backup utility, whereas another could be represented as a word processor, and yet another as a wallpaper app. What types of behaviors are reasonably expected from each varies. For example, whereas a backup utility would be expected to copy every file on the user's computer 210 to an external destination, a wallpaper app would not.

What specific data 307 is mined from which sources in order to categorize an application 301 can vary between embodiments. In one embodiment, sources such as those described above are mined for keywords indicative of application categories, such as "office suite," "spreadsheet," "email," "text message," "camera," "record," "video player," "music player," "game," "wallpaper," "backup," "disk defragment," "travel," etc. In other embodiments, more specific data 307 is sought, such as key phrases associated with application categories, combinations of words in various proximities to each other, specific user interface resource text, etc.

An application categorizing module 309 of the application expectation management system 101 categorizes applications 301 based on the mined data 307. As explained in detail below, different categories of applications 301 correlate with certain reasonably expected behaviors. It is to be understood that as used herein, "categorizing" an application 301 refers to labeling an application 301 according to expected functionality, responsive to gleaned data 307 concerning the application 301. For example, a specific application 301 could be categorized as a backup utility in response to the presence of, for example, certain keywords such as "backup" in marketing material or user reviews describing the application 301. The categorization of the application 301 as a backup utility indicates that the application 301 can reasonably be expected to copy all or a subset of files from the user's computer 210 to an offsite storage medium. The application categorizing module 309 can categorize applications 301 at various levels of granularity, for example, this application 301 is a word processor, this application uses email, this application engages in network communication, etc. A single application 301 can be assigned to multiple categories at varying levels (e.g., an appointment dialer, an app that accesses the calendar, an app that makes phone calls, etc.). Basically, keywords or other mined data 307 in application descriptions, documentation, marketing information and the like correlate with certain expected application behaviors. Additionally, keywords in reviews of applications 301 and forum discussions correlate with certain expected application behaviors. Likewise, keywords and user interface resource text in application binary images correlate with certain expected behaviors. Categorization of an application 301 can be thought of as applying one or more labels to the application 301, each label indicating one or more behaviors that are expected of the application 301 based on corresponding data 307 concerning the application 301.

A weighting module 311 of the application expectation management system 101 can apply weights 313 to mined data 307 concerning an application 301, as well as to the association between the mined data 307 and the categorization of the application 301. Mined data 307 can be weighted based on, e.g., its content, its source or a combination of these. For example, suppose an application 301 displays a button (or other user interface element) with text indicating an action (e.g., make a phone call, get the current location, send contact data, etc.) that will result from pressing the button. In response, the application 301 would be strongly expected to perform the described action, and thus the presence of the text on the application's user interface would be weighted more heavily than, e.g., an indication in a user review that the application 301 is of a certain type (e.g., a word processor) that typically does not perform a given behavior (e.g., make phone calls). Each correlation between mined data 307 and an expected behavior tends to have its own strengths and weaknesses in terms of anticipated accuracy, and the weighting module 311 can apply weights 313 to the data 307 and/or the correlations accordingly to achieve greater accuracy. It is to be understood that the specific weights 313 to apply to specific data 307 and/or correlations is a design parameter that can vary between embodiments, and (as discussed below) can be adjusted over time.

In one embodiment, a machine learning module 315 of the application expectation management system 101 applies machine learning and/or clustering algorithms to tune the data mining and/or application categorization over time, in order to increase accuracy. More specifically, the machine learning module 315 can train the application expectation management system 101 on sets of known good and bad data 307 (e.g., data 307 known to accurately correlate with specific application behaviors and data 307 known not to do so). In response to the training, the application expectation management system 101 can adjust what data 307 it mines from which sources, what correlations it makes between various data 307 and expected behaviors, and what weights 313 it applies in so doing. The machine learning module 315 can monitor the results for accuracy when the trained application expectation management system 101 operates on unknown sets (i.e., real parameters in the field as opposed to training data sets). Based on the results, the machine learning module 315 can fine tune the data mining, application categorization and weighting, to increase accuracy over time. In effect, the application expectation management system 101 can be tuned to more accurately determine what application data 307 to mine from which sources, in order to determine which behaviors can be legitimately expected from which categories of applications 301.

A consistency determining module 317 of the application expectation management system 101 determines "measures of consistency" 319 between the detected behaviors of a specific application 301 and the expected behaviors of the application 301. A measure of consistency 319 is a quantification of the difference between a detected behavior and an expected one. Measures of consistency 319 can be determined by comparing the results of the above-described static and/or dynamic analysis of a given application 301 to the application's expected behaviors. As explained above, the expected behaviors are determined based on the mining of application data 307 and the resulting categorization of the application 301. By comparing the detected behavior of the application 301 (as determined from the application 301 analysis) to the expected behavior (as determined from the correlations of mined application data 307 to expected actions), quantifications can be made as to whether the application's behaviors are within the bounds of what is expected, or whether and to what extent the behaviors are suspicious. For each action the analysis indicates the application 301 performs (e.g., reads contacts, sends an email to a given target, copies specific data to a specific destination, sends numerous text messages to a premium service, etc.), an expectation measure 319 can quantify an extent to which the action is or is not expected.

The specific implementation format of expectation measures 319 can vary between embodiments. For example, an expectation measure can be in the form of a number within a specific range (e.g., 0 to 100), indicating to what extent the corresponding action is expected (e.g., 0 indicating entirely unexpected and thus highly suspicious and 100 indicating entirely expected and thus not at all suspicious). The consistency determining module 317 can in effect filter the results of the static and/or dynamic analysis of applications 301 to identify and quantify any unexpected application behaviors, and thus determine a likelihood that the application 301 is malicious. More specifically, the consistency determining module 317 determines whether or not an application's actions (or given aspects of them) are, by some measure, consistent with what a user should reasonably expect from the application 301.

It is to be understood that the specific quantification of how suspicious various differences between detected and expected behaviors are considered to be is a design parameter that can vary between embodiments. Some differences would typically be quantified as minimally suspicious, with others as extremely suspicious, and many in between. For example, unexpected access of privacy sensitive data such as the user's contacts would typically be considered more suspicious than an unexpected action less prone to malicious abuse, such as the unexpected sorting of a list into alphabetical order. Where communication occurs (e.g., email, text message, phone, network transmission), not only the content of the communication but the destination can be taken into account as well, both in determining whether the action is expected and in quantifying the suspiciousness of any unexpected communication. For example, a given application may be expected to transmit data from the user's computing device to third party destinations, but not to, for example, a known phishing site. Further, even if an application 301 is not expected to transmit data at all, a transmission to the application publisher's known legitimate website (determined from, e.g., a DNS registry) would typically be considered less suspicious than a transmission to, for example, an unknown site in Russia. Likewise, some actions may be expected and/or less suspicious when executed in the foreground, but unexpected and/or more suspicious when conducted in the background. For example, backing up the storage media in the foreground after prompting the user would typically be considered less suspicious than doing so in the background without prompting the user. Additionally, in some embodiments certain combinations of actions performed in succession, and in some cases in a specific order, are considered suspicious, whereas the individual actions making up the combination are not considered suspicious when performed in isolation. For example, it may be expected (or at least not suspicious) for an application 301 to receive instant messages and separately to establish network connections. However, the combination of receiving an instant message and then establishing a network connection within a given short amount of time (e.g., two seconds, thirty seconds, one minute) is unexpected, and therefore suspicious. Application behaviors (or combinations thereof) can also be expected or unexpected based on the time(s) at which they are performed and/or the location of the computing device 210. For example, some actions could be expected during the day (e.g., during business hours) but not at night. Actions could also be expected when the computing device 210 is located at, e.g., the user's office and/or home, but not when it located elsewhere, e.g., in a public place. Furthermore, some actions can be expected within a given proximity of time after the computing devices starts up, but not after it has been running for more than a given amount of time (or vice versa).

Based on the above-described functionality, an application adjudicating module 321 of the application expectation management system 101 can adjudicate whether the application is suspect of being malicious. More specifically, responsive to the determined measures of consistency, the application adjudicating module 321 can adjudicate the application 301 as being malicious, benign, or suspicious. In different embodiments, different actions can be performed in response to these adjudications. For example, in response to determining that an application 301 is malicious or suspicious, the user can be warned, the application can be quarantined or removed, an anti-malware product on the user's computer 210 can be activated, information concerning the application can be sent to a central security server, etc.

As described above, the application expectation management system 101 provides a way to identify behaviors that would not reasonably be expected from a given application 301. Actions taken by an application 301 are a potential risk where they are not consistent with the expected behavior of the specific application 301. By quantifying whether and to what extent detected application behaviors are reasonably expected or not, the application expectation management system 101 can determine whether a given application 301 is reasonably suspect of being malicious, as opposed to simply whether the application 301 performs an action or requests a permission that could be used maliciously, but which also has many legitimate uses.

Figure 4:
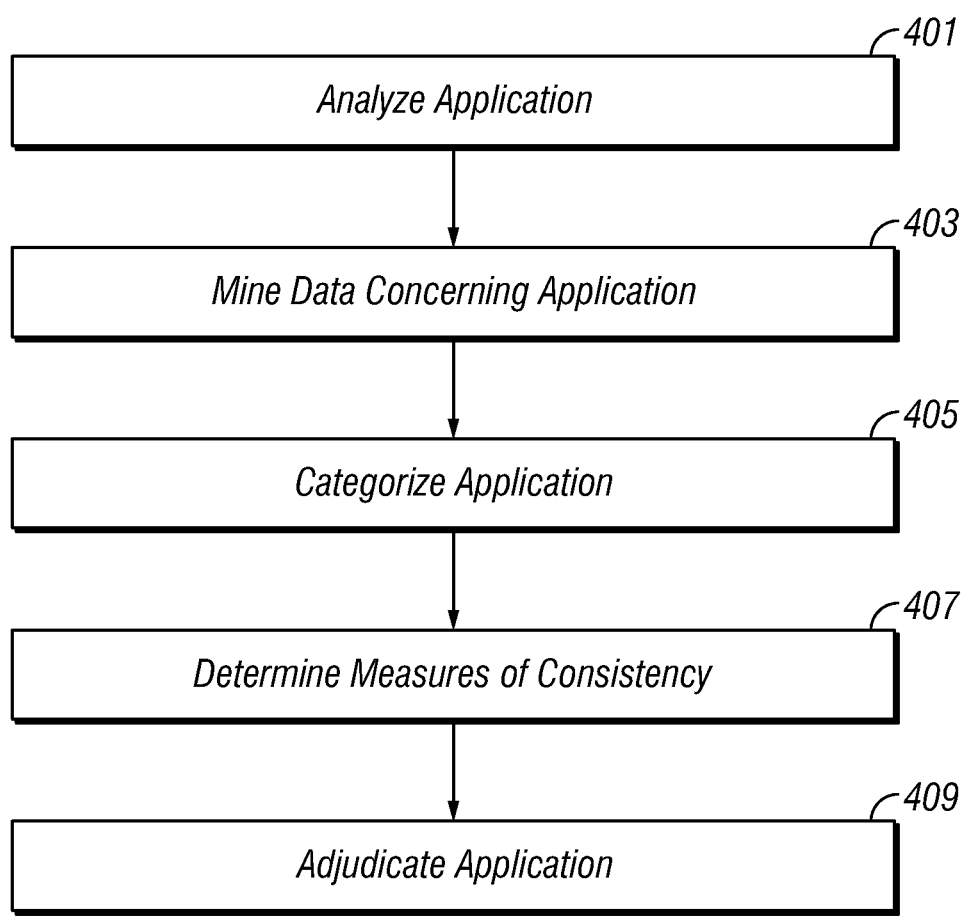
FIG. 4 is a flowchart of the operation of an application expectation management system, according to some embodiments.

FIG. 4 is a flowchart of the operation of the application expectation management system 101, according to some embodiments. The application analyzing module 303 analyzes 401 the application 301, thereby detecting behaviors of the application 301. The application data mining module 305 mines 403 data 307 indicative of the functionality of the application 301 from a plurality of sources. The application categorizing module 309 categorizes 405 the application 301 based on the mined data 307, the categorizing of the application indicating expected behaviors of the application 301. The consistency determining module 317 determines 407 measures of consistency 319 between the detected behaviors of the application 301 and the expected behaviors of the application 301. Responsive to the determined measures of consistency 319, the application adjudicating module 321 adjudicates 409 whether the application 301 is suspect of being malicious.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for quantifying differences between detected behaviors of an application and expected behaviors of the application, in order to determine whether the application is suspect of being malicious, the method comprising the steps of:
    analyzing the application, by a computer, wherein the analyzing of the application detects application behaviors;
    mining data indicative of the functionality of the application from a plurality of sources, by the computer;
    categorizing the application based on the mined data, by the computer, wherein the categorizing of the application indicates expected application behaviors;
    determining measures of consistency between the detected behaviors of the application and the expected behaviors of the application, by the computer; and
    responsive to the determined measures of consistency, adjudicating whether the application is suspect of being malicious, by the computer.

2. The method of claim 1 wherein analyzing the application further comprises:
    determining permissions that the application requests.

3. The method of claim 1 wherein analyzing the application further comprises:
    determining data that the application attempts to access.

4. The method of claim 1 wherein analyzing the application further comprises:
    determining at least one system resource that the application attempts to access.

5. The method of claim 1 wherein analyzing the application further comprises:
    determining at least one action that the application executes.

6. The method of claim 1 wherein analyzing the application further comprises:
    detecting functionality performed by the application, by examining a binary image of the application.

7. The method of claim 1 wherein analyzing the application further comprises:
    detecting functionality performed by the application by running the application in an isolated environment and monitoring its behavior.

8. The method of claim 1 wherein mining data indicative of the functionality of the application further comprises:
    mining data concerning the application, wherein the mined data is indicative of how the application is represented by a publisher of the application.

9. The method of claim 1 wherein mining data indicative of the functionality of the application further comprises:
    mining data concerning the application, wherein the mined data is indicative of how the application is described by at least one third party.

10. The method of claim 1 wherein mining data indicative of the functionality of the application further comprises:
    performing a web search for the application; and
    mining data concerning the application from results of the web search.

11. The method of claim 1 wherein mining data indicative of the functionality of the application further comprises:
    mining textual data from the application itself.

12. The method of claim 1 wherein mining data indicative of the functionality of the application from a plurality of sources further comprises:
    locating keywords in the plurality of sources, the keywords being indicative of at least one application category.

13. The method of claim 1 wherein categorizing the application further comprises:
    applying at least one label indicative of at least one expected behavior to the application.

14. The method of claim 1 wherein categorizing the application further comprises:
    assigning multiple categories to the application, wherein each assigned category correlates with at least one expected application behavior.

15. The method of claim 1 wherein determining measures of consistency between the detected behaviors of the application and the expected behaviors of the application further comprises:
    quantifying differences between detected behaviors of the application and expected behaviors of the application.

16. The method of claim 1 wherein adjudicating whether the application is suspect of being malicious further comprises:
    adjudicating the application as being one from a group consisting of: benign, suspicious and malicious.

17. The method of claim 1 further comprising:
    applying at least one weight to at least one from a group consisting of: 1) at least some mined data, and 2) at least one correlation between mined data and at least one expected application behavior.

18. The method of claim 1 further comprising:
    utilizing machine learning to adjust, over time, at least one step from a group of steps consisting of: 1) mining data indicative of the functionality of the application from a plurality of sources, and 2) categorizing the application, wherein the categorizing of the application indicates expected application behaviors.

19. At least one non-transitory computer readable medium for quantifying differences between detected behaviors of an application and expected behaviors of the application, in order to determine whether the application is suspect of being malicious, the at least one non-transitory computer readable medium storing program code that, when loaded into computer memory and executed by a processor performs the following steps:
    analyzing the application wherein the analyzing of the application detects application behaviors;
    mining data indicative of the functionality of the application from a plurality of sources;
    categorizing the application based on the mined data wherein the categorizing of the application indicates expected application behaviors;
    determining measures of consistency between the detected behaviors of the application and the expected behaviors of the application; and
    responsive to the determined measures of consistency, adjudicating whether the application is suspect of being malicious.

20. A computer system for quantifying differences between detected behaviors of an application and expected behaviors of the application, in order to determine whether the application is suspect of being malicious, the computer system comprising:
    computer memory;

at least one processor;

an application analyzing module residing in the computer memory, configured to analyze the application, wherein the analyzing of the application detects application behaviors;

an application data mining module residing in the computer memory, configured to mine data indicative of the functionality of the application from a plurality of sources;

an application categorizing module residing in the computer memory, configured to categorize the application based on the mined data wherein the categorizing of the application indicates expected application behaviors;

a consistency determining module residing in the computer memory, configured to determine measures of consistency between the detected behaviors of the application and the expected behaviors of the application; and an application adjudicating module residing in the computer memory, configured to adjudicate whether the application is suspect of being malicious, responsive to the determined measures of consistency.

* * * * *